J. P. GALLAGHER.
Fire-Plugs.
No. 141,131. Patented July 22, 1873.
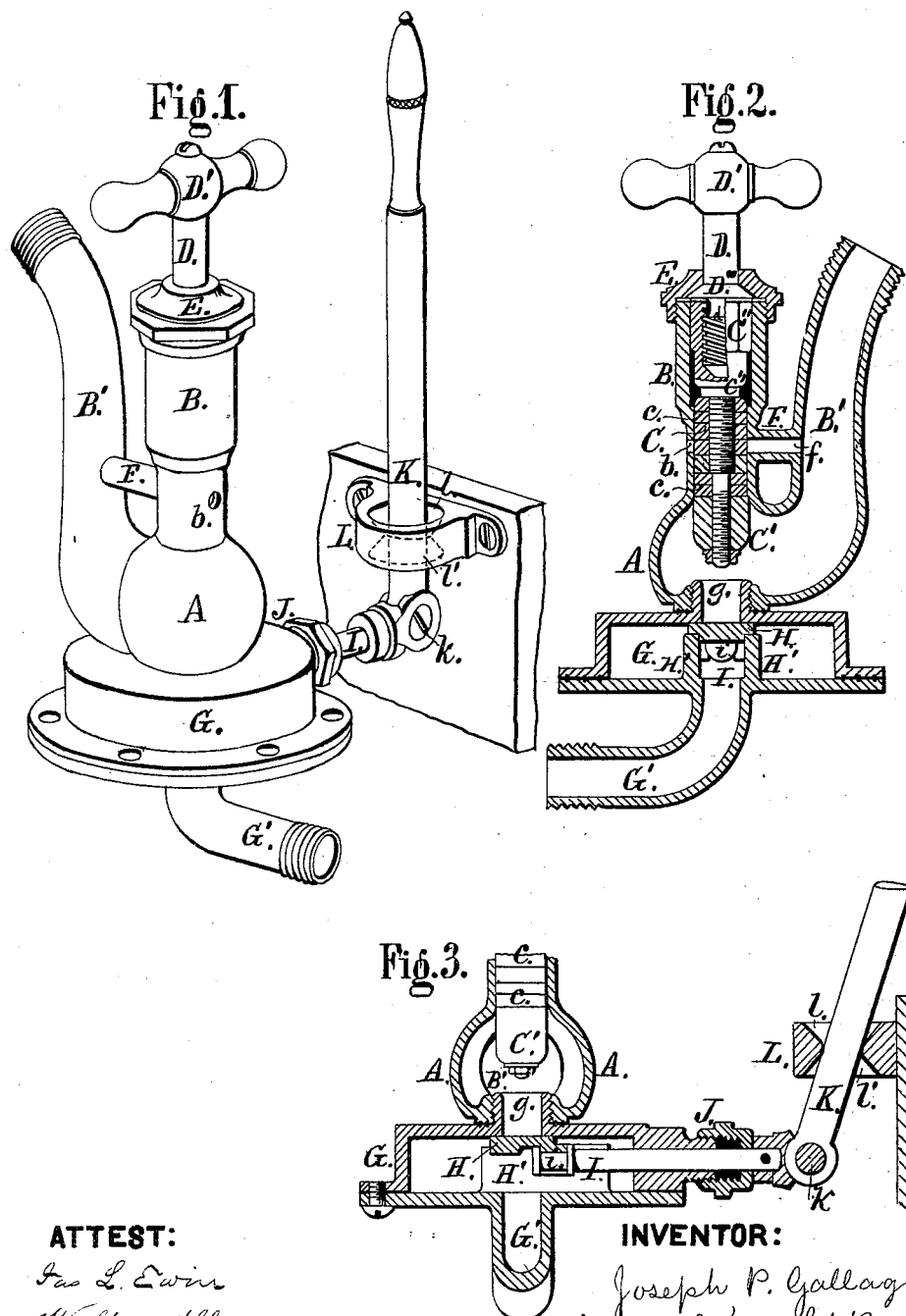
ATTEST:
Jas L. Ewin
Walter Allen
INVENTOR:
Joseph P. Gallagher
By Knight Bros.
Attys

UNITED STATES PATENT OFFICE.

JOSEPH P. GALLAGHER, OF ST. LOUIS, MISSOURI.

IMPROVEMENT IN FIRE-PLUGS.

Specification forming part of Letters Patent No. 141,131, dated July 22, 1873; application filed May 19, 1873.

*To all whom it may concern:*

Be it known that I, JOSEPH P. GALLAGHER, of St. Louis, St. Louis county, Missouri, have invented a certain Improvement in Fire-Plugs, of which the following is a specification:

This invention consists, principally, in the formation of an additional slide-valve and valve-chamber, the latter having an extension-barrel, in which moves a compound valve that is properly packed within such barrel, to close the water-escape orifice when the main valve is open. The stem has at the lower end a valve, which has a raised seat at the bottom of the valve-chamber. The upper part of the valve-stem is of square or other angular form, to prevent its turning, and has a screw-threaded socket, in which turns a hand screw or shaft to move the valve. The said hand screw-shaft has a conical or other collar that prevents its vertical movement, and which may be packed or have a ground joint to prevent the passage of water. The under side of this collar rests on top of the extension-barrel, and its upper side is in contact with the under side of the screw-cap on the top of the barrel. The valve-chamber is formed with one or more outflow-pipes for the attachment of the hose, and the outlet pipe or pipes are connected to the extension-barrel by a brace-pipe, through which the water escapes, when the valve is closed, into an annular chamber surrounding the stem, and also in communication with the water-escape orifice on the opposite side of the barrel. The annular chamber only communicates with the water-escape orifices when the supply-valve is closed. My invention also relates to a water-chamber beneath the valve-chamber described. On the top of this chamber is a slide-valve to close communication between it and the valve-chamber to shut off the water at any time when repairs may be necessary. The lever which operates the slide-valve is fulcrumed in a bracket having a double conical socket, so as to allow its adjustment to various positions without interfering with the action of the lever. The stem of the slide-valve turns freely in the latter, so as to allow the lever to be placed at any convenient angle.

In the drawings, Figure 1 is a perspective view of my improvement. Figs. 2 and 3 are axial sections at right angles with each other.

A is the valve-chamber, of any suitable form, having an extension-barrel, B, which may be provided with one or more outlet-pipes, B', screw-threaded at their ends for the attachment of the hose. C is the plunger or valve-stem, packed by leather disks $c$, or other means, in the barrel B. The lower end of the stem has a rubber or other valve, C'. The upper end C'' is made of square or other angular form to prevent its turning, and slides in a suitably-formed socket in the top of the barrel. D is a screw-shaft, turned by hand, to open or close the valve C'. It has a screw-threaded lower end, $d$, turning in a screw-socket in the top C'' of the valve-stem. The screw-shaft D has a handle, D', by which it is turned, and has a conical or other collar, D'', which turns in a chamber between the top of the barrel B and the screw-cap E; and the disk may be packed by any suitable packing or a ground joint; but neither is absolutely necessary, as an upward leak could only take place when the surplus water should be escaping from the outflow-pipes after the closing of the supply-valve. F is a pipe forming a communication, $f$, from the outlet-pipe B' to the barrel B. $c''$ is an annular recess in the plunger or valve-stem C, which, when the plunger is down and the supply-valve closed, forms a way of escape for the water remaining in the pipe B', which then passes through the annular chamber $c''$ and escapes through the orifice $b$, passing through the side of the barrel B. G is a chamber or box having an annular upward projection, $g$, forming the seat of the valve C', on the outer side of which is screwed the valve-chamber A. G' is the supply-pipe. H is a slide-valve, supported on slides H', and having a valve-stem, I, turning freely therein at $i$. The valve-stem passes through a stuffing-box, J, and is pivoted at $k$ to a lever, K, by which it is drawn out or forced in to open or close the valve H. L is an adjustable fulcrum-bracket, having an orifice through which the lever K passes. This orifice is countersunk on both sides at $l\ l'$, so as to allow the lever free play therein. The form of the orifice $l\ l'$ is such that the bracket can be attached in any position, so that its length, as shown, is at right angles to the length of the lever, and at any desired distance between the ends.

The operation of the device is as follows: To open the valve C', the screw-shaft D is turned and the valve-stem C is drawn up by the screw $d$. This allows the water to escape through the pipe B'. The raising of the stem C closes the escape-orifices $f$ and $b$ by the stem-packing $c$. When the valve C' is again closed, the annular chamber $c''$ is brought opposite the orifices $f$ and $b$, and the surplus water escapes from the pipe B' through the passage $f$, annular chamber $c''$, and orifice $b$; so the fire-plug is not subject to freeze up in winter.

I claim—

1. The combination of valve-chamber A, barrel B, compound valve C $c$ C', having annular recess or chamber $c''$, outlet-pipe B', and escape-passages $f$ $b$, substantially as set forth.

2. The slide-valve H, working in the chamber G and operated by the valve-stem I, lever K, and fulcrum-bracket L, in combination with the chamber A and pipe B', substantially as and for the purpose shown and described.

3. The combination of the valve-chamber A, barrel B, outlet or outlets B', valves C $c$ C', hand-screw D $d$, having collar D'', and the water-escape passages $f$ $b$, substantially as set forth.

JOSEPH P. GALLAGHER.

Witnesses:
SAML. KNIGHT,
ROBERT BURNS.